United States Patent [11] 3,567,849

[72] Inventors Kenjiro Takayanagi;
Tomiyuki Tanaka; Yoshihiko Ota, Tokyo, Japan
[21] Appl. No. 678,857
[22] Filed Oct. 30, 1967
[45] Patented Mar. 2, 1971
[73] Assignee Victor Company of Japan, Limited
Yokohama, Japan
[32] Priority Oct. 29, 1966
[33] Japan
[31] 41/71,226

[54] VARIABLE BANDWIDTH MAGNETIC RECORDING SYSTEM
5 Claims, 7 Drawing Figs.

[52] U.S. Cl. .... 178/6.6, 178/6, 179/15.55
[51] Int. Cl. .... H04n 1/28, H04n 5/78, H04n 7/12
[50] Field of Search .... 178/6 (Var BW), 6.6 (A); 179/15.55; 325/45, 145, 187 (Inquired)

[56] References Cited
UNITED STATES PATENTS

| | | | |
|---|---|---|---|
| 2,717,931 | 9/1955 | Duke | 178/6 |
| 2,909,596 | 10/1959 | Fay | 178/6.6 |
| 3,230,306 | 1/1966 | Takayanagi | 178/6.6 |
| 3,352,969 | 11/1967 | Konings | 178/6 |

FOREIGN PATENTS

| | | | |
|---|---|---|---|
| 252,136 | 1/1963 | Australia | 178/6 |

*Primary Examiner*—Bernard Konick
*Assistant Examiner*—Steven B. Pokotilow
*Attorney*—Louis Bernat ABSTRACT: A variable bandwidth magnetic recording system records a modulated carrier wave which is frequency-modulated by a video signal that is to be transmitted. The transmitted frequency band can be varied in accordance with the instantaneous value of the voltage or voltages of the low frequency component of the video signal, which include a mean brightness in a horizontal scanning period or in a vertical scanning field. When the instantaneous value voltage or voltages are high, the width of the transmitted frequency band is increased. When the instantaneous value voltage or voltages are low, the width of the transmitted frequency band is reduced.

INVENTORS
KENJIRO TAKAYANAGI
TOMIYUKI TANAKA
YOSHIHIKO OTA

BY [signature]

ATTORNEY

INVENTORS
KENJIRO TAKAYANAGI
TOMIYUKI TANAKA
YOSHIHIKO OTA

BY [signature]

ATTORNEY

INVENTORS
KENJIRO TAKAYANAGI
TOMIYUKI TANAKA
YOSHIHIKO OTA
BY
[signature]
ATTORNEY

VARIABLE BANDWIDTH MAGNETIC RECORDING SYSTEM

This invention relates to a variable bandwidth magnetic recording system, and in particular to a variable bandwidth magnetic recording system which can effectively utilize a transmitted frequency band when a signal is transmitted in a narrow transmission band.

In general, we provide an apparatus for magnetically recording and reproducing a video signal (*VTR*), of the type in which a modulated wave which is frequency modulated by a video signal (as in a television signal) and then is directly recorded on and reproduced from a magnetic tape. Hitherto, there has been experienced a disturbance caused by part of the lower wave band of the modulated carrier wave being turned back as subsequently to be described. This occurs when a carrier wave frequency is selected from the frequency band for video signals. Accordingly, it is not possible to provide a high frequency carrier wave in *VTR*'s, such as simplified home *VTR*'s and industrial *VTR*'s which have a relatively narrow transmitted frequency band. This has made it necessary to greatly reduce the width of the transmitted frequency band of a video signal by using a low-pass filter.

In order to prevent the turning-back of part of the lower wave band as aforementioned, one system (See U.S. Pat. No. 3,230,306) suggests recording on a magnetic tape by mixing a carrier wave of very high first frequency with a modulated carrier wave to effect a frequency conversion. One side band of the frequency converted signal is selected by means of a band pass filter, and a carrier wave of second frequency is mixed with said selected signal for producing a signal to be recorded on a magnetic tape. The second frequency is selected in such a manner that the side band of said frequency-converted wave may not be turned back toward the lower frequencies of the band. Such a system requires an apparatus which comprises an undesirable multiplicity of parts and is not, therefore, suitable for simplified *VTR*'s.

The present invention overcomes the aforementioned defect of magnetic recording systems of the prior art. According to the invention, there is provided a magnetic recording system which most effectively utilizes a narrow transmission frequency band, and it has an improved resolving power. The system uses a variable capacity diode or diodes which show a change in static capacity corresponding to the voltage or voltages applied thereto. Alternatively, the invention may use a diode or diodes which show a change in impedance corresponding to the voltage or voltages applied thereto. These diodes are included in a low-pass filter that determines the transmitted frequencies of a video signal. The width of the transmission frequency band of the low-pass filter varies depending on the instantaneous value of the voltage or voltages of the low frequency component of a video signal when the voltage or voltages of the low frequency component are applied to said variable capacity diode or diodes or variable impedance diode or diodes, this voltage or these voltages represent mean brightness in each horizontal scanning period or in each vertical scanning field. The width of the transmission band of the low-pass filter is increased when the instantaneous value voltage or voltages are high and reduced when the instantaneous value voltage or voltages are low.

Accordingly, an object of the present invention is to provide a magnetic recording system which gives a picture of high resolution even if the transmitted frequency band is narrow.

Another object of the invention is to provide a magnetic recording system which effectively utilizes a bandwidth by changing the width of a transmitted frequency band in accordance with a change in the instantaneous value voltage or voltages of the low frequency component of a video signal.

Other objects and features of the invention will become apparent from consideration of the following description taken in conjunction with the accompanying drawings, in which.

Figure 1:
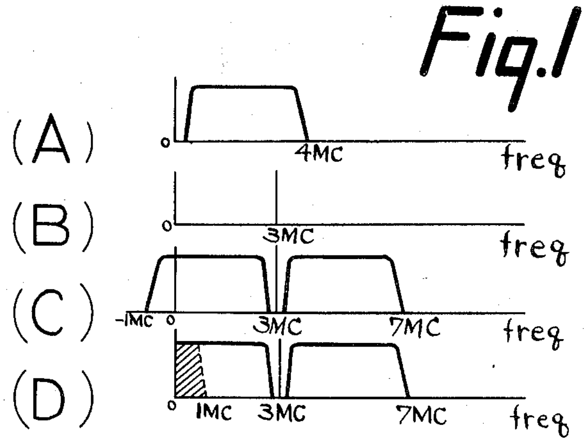
FIG. 1 is a diagram showing the occurrence of a turning-back in the low frequency components of a modulated signal.

For example, a carrier wave of 4mc. shown in FIG. 1–B is frequency modulated by a video signal having a frequency spectrum as shown in FIG. 1–A with a relatively small frequency deviation. The minimum frequency of the lower side band will be −1mc. and the maximum frequency of the upper side band will be 7mc. as shown in FIG. 1–C. Actually, however, the portion of the lower side band, which is negative, will be turned back and appear in the area indicated by a dotted line shown in FIG. 1–D. This turned-back portion of the lower side band will appear as a spurious component in the demodulated video signal and obstruct the reproduced picture.

A video signal for the television system can be regarded as a signal in which a high frequency component, representing the fine and precise portion of a picture, overlaps a low frequency component including a DC component which represents average brightness for one field or one horizontal scanning period. Accordingly, when a carrier wave of a given frequency is frequency modulated by a video signal, the center transmitted frequency of the modulated wave will show a deviation caused by the low frequency component of the video signal.

Let us assume that frequency modulation is effected and that the frequency of a carrier wave is lowered by the synchronizing signal portion of a video signal. A disturbance, due to a spurious component, appears when frequency modulation is effected by the portion of the video signal which corresponds to a bright scene. A disturbance due to a spurious component also appears when frequency modulation is effected by the portion of a video signal which corresponds to a dark scene. When these two disturbances are compared, it will be seen that the center transmitted frequency of the modulated wave will be lower in the latter than in the bright scene, because the DC component of the video signal corresponding to a dark scene is smaller than that of a video signal corresponding to a bright scene. For this reason, a disturbance due to a spurious component caused by the turning back of the lower wave band is more likely to occur when frequency modulation is effected by a portion of the video signal which corresponds to a dark scene than when frequency modulation is effected by a portion of the video signal which corresponds to a bright scene.

To prevent the occurrence of this disturbance due to the spurious component, frequency modulation must be effected by a video signal having a frequency component which is lower than the center frequency at any moment during the deviation of the center frequency of a modulated carrier wave caused by the low frequency component. To attain this end, a video signal used for effecting frequency modulation is passed through a low-pass filter in conventional systems. Thus, the maximum frequency contained in the frequency components of the video signal may be made lower than the center transmitted frequency of the carrier wave. With this arrangement, the frequency spectrum of the video signal reproduced from the magnetic tape lies in a narrow frequency band, inevitably causing a lowering in resolution of the reproduced picture.

The present invention obviates this problem. According to the invention, the width of the transmission band of a low-pass filter is made variable with respect to the level of the low frequency component of a frequency modulating signal or the instantaneous value of center frequency of a modulated wave.

The cutoff frequency of the low-pass filter is made lower than the instantaneous value of the center frequency, at all times. With this arrangement, the maximum frequency contained in the frequency modulating signal is equal to the maximum frequency in the conventional systems when the picture is darkest. However, the maximum frequency rises to a higher level than it does in the conventional systems, as the scene becomes brighter.

The resolving power of the human eye generally increases as the viewed object becomes brighter. According to this invention, a reproduced picture becomes increasingly finer in detail as the transmitted picture becomes brighter. This effectively uses a transmitted frequency band and permits a better picture than the conventional systems, while using a transmitted frequency band which is similar to that of the conventional systems.

Figure 2:
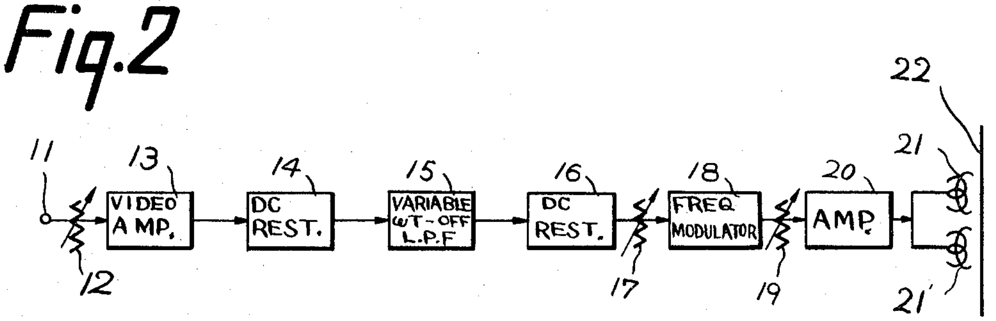
FIG. 2 is a block diagram showing one embodiment of the system according to this invention.

FIG. 2 shows one embodiment of the system according to this invention. A video signal applied to an input terminal 11, for the frequency modulating video signal, is passed through an input level regulator 12 to a video amplifier 13 where it is amplified and passed on to a DC component restorer 14. After its DC component is restored by the DC component restorer and the synchronizing signals are aligned at the front end, the video signal is passed on to a variable cutoff low-pass filter 15, the operation of which will subsequently be described in detail. The video signal having its transmitted frequency band changed, as desired by said filter 15, is successively passed through such conventional means as a DC component restorer 16, frequency deviation means 17, frequency modulator 18, modulated signal level regulator 19, and recording amplifier 20 to rotary magnetic recording heads 21 and 21'. Two rotary magnetic heads are employed in this embodiment for recording on a magnetic tape 22.

Figure 3:
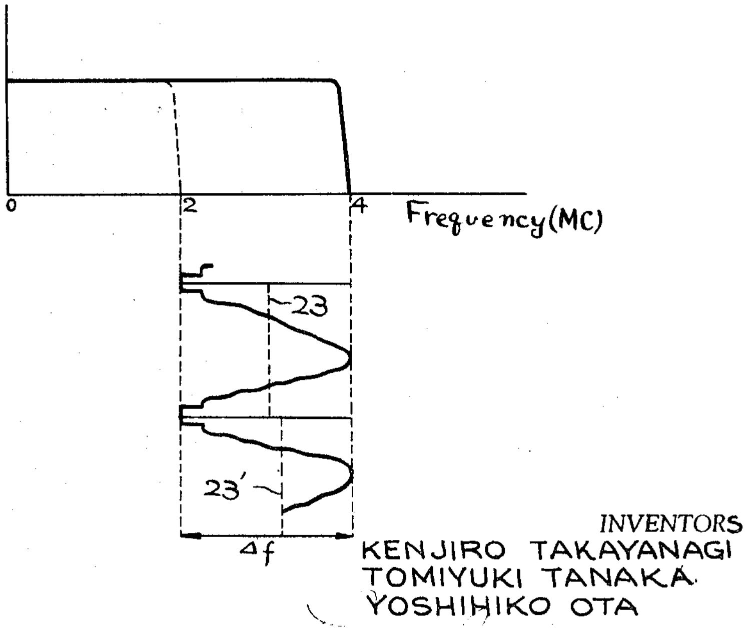
FIG. 3 is a diagram in explanation of the system according to this invention.

The principles of operation of the variable cutoff, low-pass filter 15 will be now described, with reference to FIG. 3. Let us assume that the frequency deviation $\Delta f(=2mc.)$ of the carrier wave is set so that the frequencies of the carrier wave modulated by a video signal have a maximum frequency of 4mc. at the white peak of the video signal and 2mc. at the front end of the synchronizing signal. There is no turning back if the frequency of the carrier wave corresponding to the level of DC components of the video signal is 3.5mc., and if frequency modulation is effected by a video signal having the maximum frequency component of 3.5mc. However, a turning-back will occur if the frequency of the carrier wave corresponding to the level of DC component of a video signal is 2.5mc.

In the system according to

In the system according to this invention, the transmitted frequency band of a video signal can be made variable in such a manner that the frequency of the carrier wave corresponding to the DC component of the video signal may be made equal to or higher than the maximum frequency of the modulating signal, to thereby prevent the occurrence of a turning-back. Thus, if the frequency of the carrier wave corresponding to the DC components is 3.5mc., the transmitted frequency band of the video signal will be made 3.5mc., if the carrier wave is 2.5mc., the video signal will be made 2.5mc.

The process in which the level of DC component is taken out of a video signal will now be described. Assume that the level of the DC component is to be set for each horizontal scanning period. The DC components of adjacent horizontal scanning periods will be expressed as shown at 23 and 23' in FIG. 3. Accordingly, if the DC components of horizontal scanning periods are connected together, there is a stepped wave form with elevations and depressions. Since this step varies for each scanning period, the wave form may be approximately expressed by frequency components (including the DC component) of up to $10 f_H$ according to the method of Fourier frequency analysis, with $f_H$ being the frequency of horizontal scanning. Therefore, if a video signal is applied to a fixed cutoff filter that passes frequencies up to $10 f_H$, its output will be made approximately equal to the DC component of the horizontal scanning period.

I As evident from a Fourier frequency analysis of the frequency components included in this step wave form, the higher harmonic components, which are at least 10times as high as the vertical scanning frequency, are small and may be neglected. Therefore, if a video signal is applied to a fixed cutoff low-pass filter having a cutoff frequency which is 10times higher than the vertical scanning frequency, a wave form of level DC components of the video signal, during every vertical scanning period, is obtained from the output terminal of the fixed cutoff low-pass filter.

The output voltage of the fixed cutoff low-pass filter is applied to a variable capacitance or impedance diode in the variable cutoff frequency low-pass filter. The cutoff frequency of the variable cutoff frequency low-pass filter is varied in accordance with the output voltage of the fixed cutoff low-pass filter. That is, the DC component of the video signal is varied during every vertical scanning period.

If the level of DC component is set for each period, it will be apparent from the foregoing description that the transmission band of the low-pass filter may advantageously be made to have an upper limit of $10 f_v$, with $f_v$ being the frequency of the field.

Figure 4:
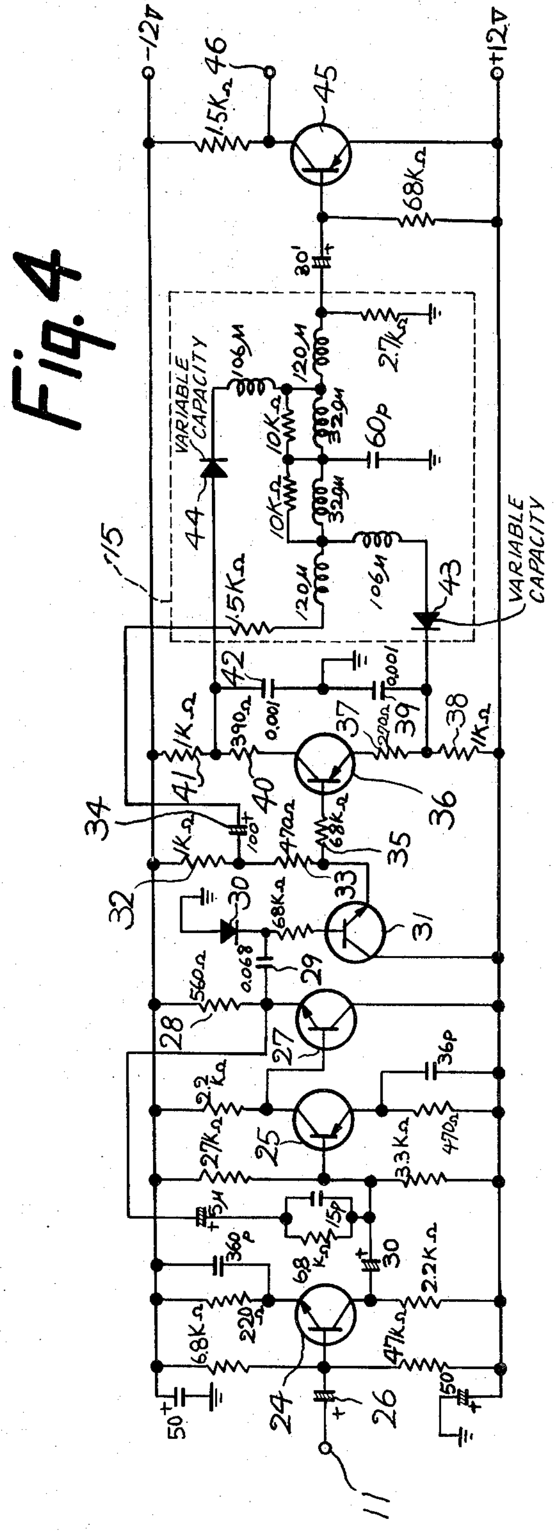
FIG. 4 is a diagram showing one embodiment of an electronic circuit including the essential portion of the system according to this invention.

One embodiment of the electronic circuit for the variable cutoff, low-pass filter 15 will be described with reference to FIG. 4. A video signal is introduced into the base of a transistor 24, through the input terminal 11, and a capacitor 26. The signal is amplified by about 20 db by a conventional negative feedback amplifier including transistors 24 and 25, and is passed through an emitter-follower transistor 27 to appear, as a signal of sufficiently low impedance, in a resistor 28 connected to the emitter of the transistor 27. This signal has its DC component restored by a capacitor 29 and a diode 30. After its DC component is restored, the signal is passed through an emitter-follower transistor 31 to appear again as a signal of low impedance between resistors 32 and 33, which are connected to the emitter of the transistor 31. The signal appearing at the connecting point between the resistors 32 and 33 is fed through a capacitor 34 to the variable cutoff low-pass filter 15, which constitutes the essential portion of the system of this invention, for producing a signal to be recorded.

On the other hand, a transistor 26, connected by direct coupling to the emitter of transistor 31, effects DC amplification of the signal appearing in the emitter of transistor 31. The transistor 36 also serves as a phase splitter. The signals appearing in the emitter and the collector of the transistor 36 differ from each other, in phase, by 180°. These signals are passed through a fixed cutoff low-pass filter comprising resistors 37 and 38, a capacitor 39, and another fixed cutoff low-pass filter comprising a capacitor 42, and resistors 40 and 41.

Thus, the signals at the emitter and collector of the transistor 36 are used as signals corresponding to the DC component of the horizontal scanning period as aforementioned. These two signal voltages are applied to variable capacity diodes 43 and 44, respectively, which constitutes the elements of a variable cutoff low-pass filter. These signal voltages operate as control signals which cause a variation to occur in the static capacity of the variable capacity diodes, to thereby change the cutoff frequency of the variable cutoff low-pass filter.

The variable cutoff low-pass filter 15 (enclosed in broken lines) is a filter consisting of a combination of a constant K filter and a derived *m*-type filter. More particularly, in a four terminal constant K filter, the impedance of a coil element is in series between one terminal of both the input and output pair of terminals, and the impedance of a capacitor element is connected across the output pair of terminals. A derived *m*-type filter is a filter wherein the open-circuit impedance and short circuit admittance at one terminal pair are $1/m$ times larger than the open-circuit impedance and the short circuit admittance at the other terminal pair of the constant K filter, respectively. Here the coil is in series between a first terminal of each pair, and a series circuit containing a coil and a capacitor is connected across the output terminal pair. Since these filters are well known in the art, a detailed description of the filter will be omitted. The combined filter is obtained by connecting the above-described derived $m$ and constant K filters in cascade. Two of such combined filters may be connected in a cascaded back-to-back relation. It will thus be appreciated that the control signal voltages corresponding to the DC component of the video signal cause a variation to occur in the static capacity of the variable capacity diodes 43 and 44 to thereby change the width of transmission band of said filter 15.

It should be noted that splitting the phase of the signal by means of transistor 36 and connecting the diodes 43 and 44 so that they are oriented in opposite polarities have the effect of changing the phase of the control signals by 180°. This changed phase offsets the unwanted control signals which might otherwise be transferred to the main transmission circuit. The output of the variable cutoff filter 15 is passed on to a transistor 45 where it is amplified and taken out through a terminal 46 connected to the collector of said transistor. The output is delivered to the next frequency modulator (not shown).

In operation, a video signal, which is to be recorded, is applied through the capacitor 34 to the variable cutoff low-pass filter 15. A control signal corresponding to the direct current component in a horizontal or vertical scanning period is applied inversely to the variable capacitance diodes 44 and 43. Since the direct current component corresponding to a bright scene becomes larger, during bright scenes, the capacities of the diodes 43 and 44 decrease and the cutoff frequency of the variable cutoff low-pass filter 15 increases. A video signal to be recorded, developed from the filter 15, is applied through the capacitor 30′ to the base of the transistor 45. Since the direct current component corresponding to the signal of the dark scene becomes smaller, during dark scenes, the capacities of the diodes 43 and 44 increase, and the cutoff frequency becomes lower. For this reason, the maximum frequency component of the video signal developed from the variable cutoff filter 15, and applied through the capacitor 30′, is lower in dark scenes than in the bright scenes.

Figure 5:
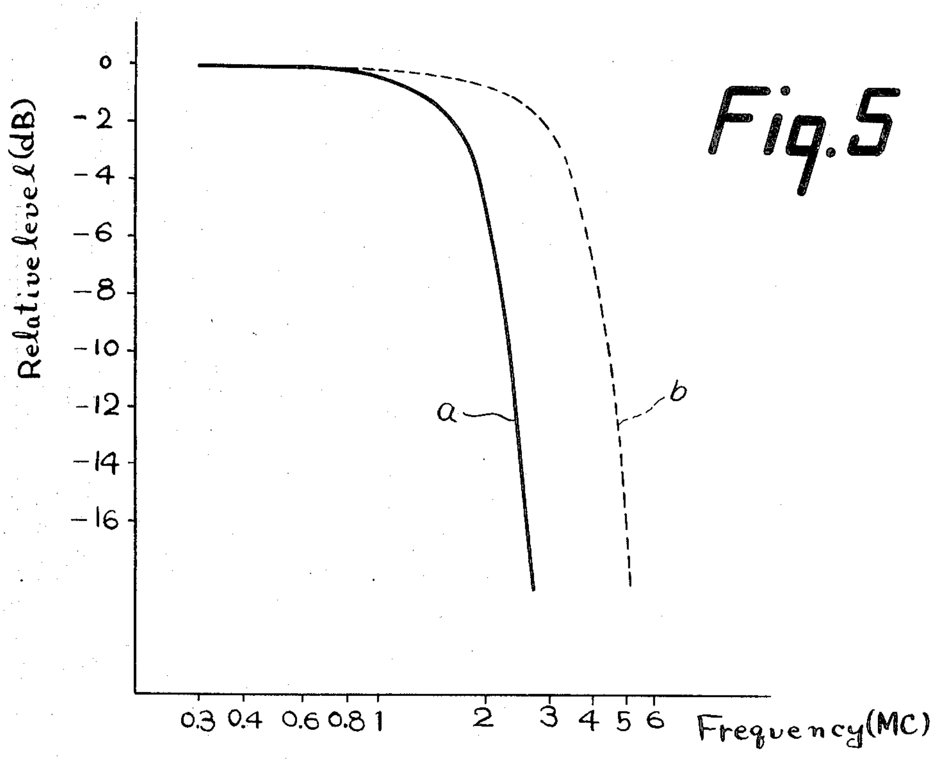
FIG. 5 is a diagram showing the frequency response characteristics or transmitted frequency band characteristics of the circuit shown in FIG. 4.

FIG. 5 shows the frequency response characteristics of the circuit (FIG. 4) described above or the transmitted frequency band characteristics of a video signal. A curve $a$, shown by a solid line, represents the characteristics of a signal having a level of DC component at the front end of the synchronizing signal. A curve $b$, shown in a broken line, represents the characteristics of a signal of which the level of DC component lies at the white peak. It will be understood from this diagram that the embodiment described permits a signal variation to occur in the transmitted frequency band of a video signal in the range defined by the curves $a$ and $b$.

Figure 6:
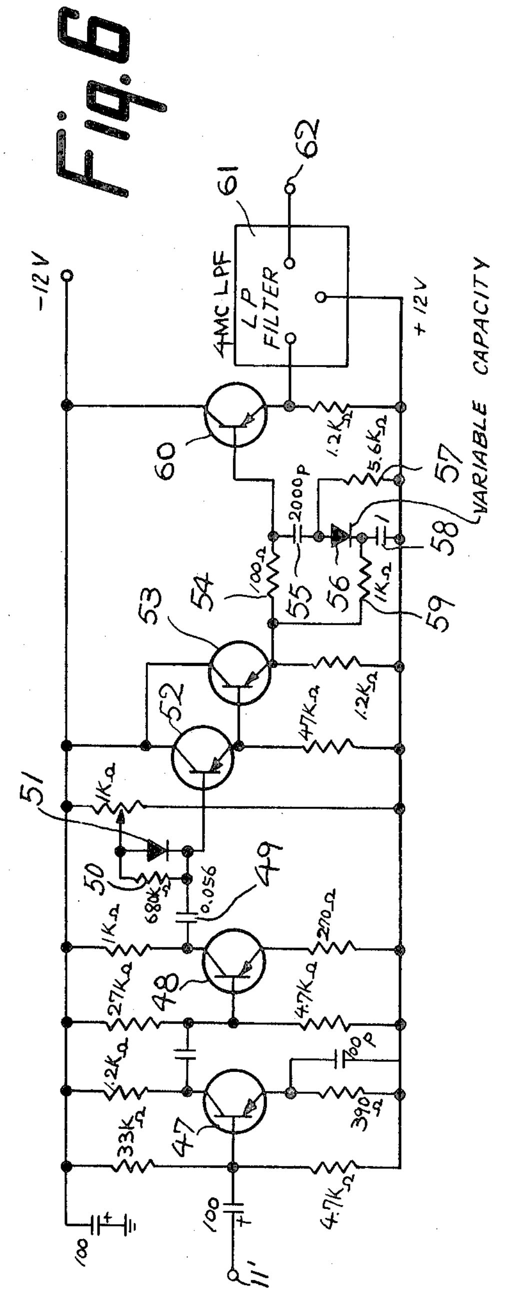
FIG. 6 is a diagram showing another embodiment of an electronic circuit including the essential portion of the system according to this invention.

Another embodiment of this invention will be described with reference to FIG. 6. A video signal is fed through an input terminal 11′ and amplified by a two-stage amplifier including transistors 47 and 48. Thereafter, the signal has its DC component restored by a circuit comprising a capacitor 49, resistor 50 and diode 51. The signal having its DC component thus reproduced is passed through a Darlington circuit comprising transistors 52 and 53, where it appears as a low impedance signal in the emitter of transistor 53. A circuit comprising a resistor 54, capacitor 55, resistor 57, diode 56, and capacitor 58 serves as a filter corresponding to the variable cutoff low-pass filter 15 shown in FIG. 2. A circuit comprising a resistor 59 and the capacitor 58 serves as a low-pass filter for taking out the DC component from the video signal.

Accordingly, the voltage produced in the emitter of transistor 53 is converted into a control voltage representing the DC component after it is passed through the resistor 59, which is applied to the cathode of variable impedance diode 56. When the diode 56 is fired, its impedance varies depending on the magnitude of the control voltage applied thereto. Thus, the aforementioned filter containing the variable impedance diode, which corresponds to the variable cutoff low-pass filter 15, can change the width of its transmission band in accordance with the magnitude of the control voltage applied thereto. The signal appearing in the emitter of transistor 53 has its frequency spectrum changed in accordance with the level of the DC component after being passed through the resistor 54. The signal is applied through an emitter-follower transistor 60 to a low-pass filter 61 having a cutoff frequency of 4mc. The signal has the width of its transmitted frequency band changed to less than 4mc. The signal with a reduced transmitted frequency band is taken out through a terminal 62 and fed to the next frequency modulator.

The operation of the main circuit shown in FIG. 6 will be explained next. According to the incremental increase of the internal resistance of the diode 56, the cutoff frequency of the variable cutoff low-pass filter becomes higher. The internal resistance is decreased according to the incremental increase of the applied positive bias voltage. A control signal voltage, derived from a video signal having a small direct current component, is lower than a control signal voltage derived from a video signal having a large direct current component. A positive voltage applied to the anode of the diode 56 becomes high when the video signal has a small direct current component, namely, when it corresponds to a darker scene. Therefore, the cutoff frequency of the variable cutoff frequency low-pass filter becomes lower when the scene becomes darker.

Figure 7:
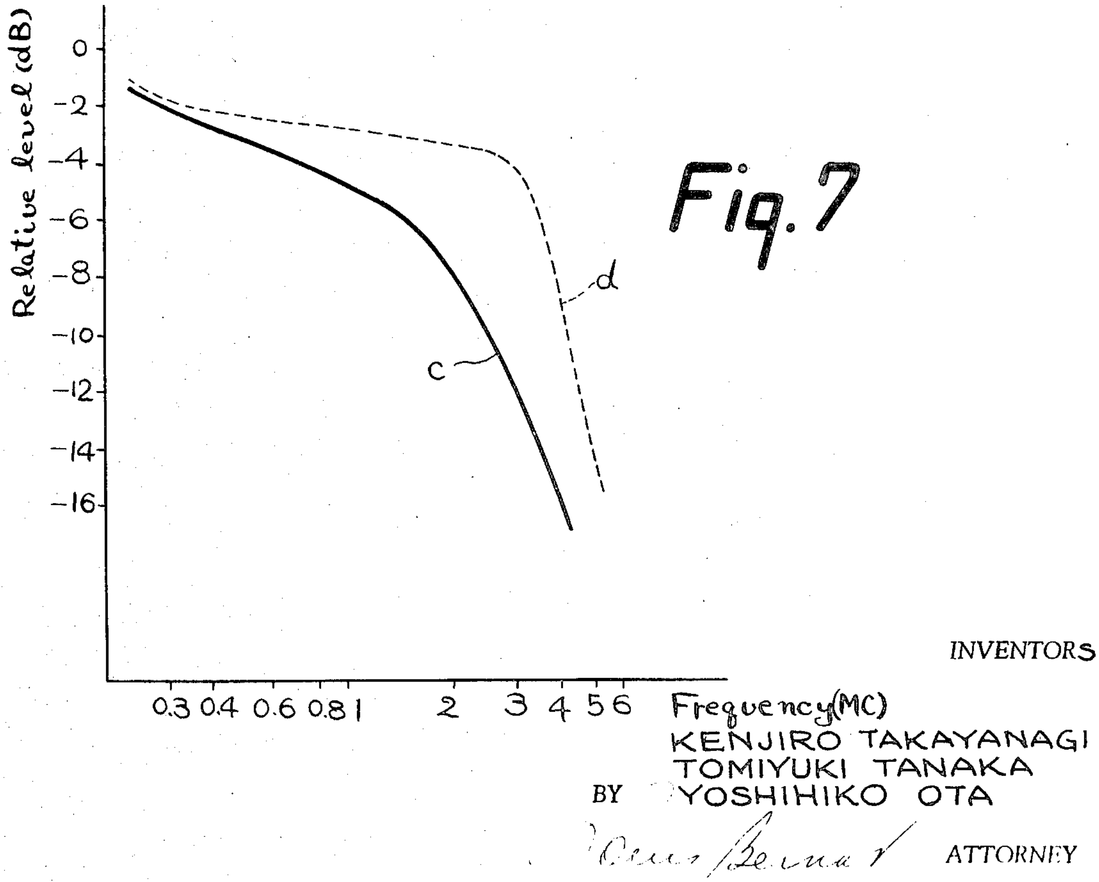
FIG. 7 is a diagram showing the frequency response characteristics or transmitted frequency band characteristics of the circuit shown in FIG. 6.

FIG. 7 shows the frequency response characteristics of the circuit (FIG. 6) described above or the transmitted frequency band characteristics of a video signal. A solid line curve $c$ represents the characteristics of a signal having a level of DC component at the front end of the synchronizing signal. A broken line curve $d$ represents the characteristics of a signal with a level of DC component lying at the white peak. It will be understood from this diagram that the embodiment described in FIG. 6 permits a variation to occur in the transmitted frequency band of a video signal in the range defined by the curves $c$ and $d$.

From the foregoing description, it will be appreciated that the system according to this invention permits the width of the transmitted frequency band to change in accordance with a change in the level of DC component of a video signal representing brightness. When this video signal causes the frequency modulation of a carrier wave, it prevents the turning-back in the low wave band of the modulated signal. When the system according to this invention, is incorporated in video tape recorders which use a relatively narrow frequency band, such as *VTR*'s for home and industrial use, it can prevent the occurrence of a disturbance due to a spurious component appearing as the result of a turning-back of the lower wave band. Still the invention makes effective use of the frequency band.

The invention has been described and shown with reference to its application in cases where the modulated wave in which frequency modulation is effected by a video signal is directly recorded on a magnetic tape. However, the invention can also have application in the modulation system described previously which use frequency heterodyne. Thus, it is to be understood that the invention is not limited to the precise forms of embodiments described, and that many changes and modifications may be made therein without departing from the spirit of the invention.

We claim:

1. A magnetic recording system in which a television video signal or other wide band signals are recorded on a magnetic recording medium, the system comprising in combination means for producing a control voltage or voltages in response to the voltage level of a DC component of a video signal to be recorded during every predetermined period, variable cutoff frequency low-pass filter means having a cutoff frequency which changes to vary the width of its transmission band as a function of the level of the control voltage or voltages, means for applying said video signal and said control voltage or voltages to said variable cutoff frequency low-pass filter means, oscillator means for producing a carrier wave of a predetermined frequency which is lower than the maximum frequency of said video signal, modulation means for frequency modulating said carrier wave by means of an output from said variable cutoff frequency low-pass filter means, the deviated carrier frequencies of said modulation means corresponding to said voltage level of a DC component being equal to or higher than the maximum frequency of said video signal during said predetermined period for preventing a turning back of the low frequency components included in a side band of said frequency modulated wave, and means for recording the frequency modulated wave produced by said modulation means on said magnetic recording medium.

2. A magnetic recording system as defined in claim 1 wherein said video signal includes a recurring synchronizing signal, wherein said predetermined period is the period of the field frequency of said video signal, and wherein said control voltage or voltages represents the voltage level of a DC component of the video signal to be recorded during every period of the field frequency, said means for producing a control voltage or voltages comprises DC restoring means for aligning the front end of said synchronizing signal in the video signal, fixed cutoff frequency low-pass filter means having a fixed cutoff frequency which is at least 10 times as high as the field frequency of said video signal, and means for separating the control voltage or voltages from the video signal by passing the output video signal from said DC restoring means through said fixed cutoff frequency low-pass filter means.

3. A magnetic recording system as defined in claim 1 wherein said video signal has a recurring synchronizing signal, wherein said predetermined period is the period of the horizontal scanning frequency of the video signal, said control voltage or voltages representing the voltage level of a DC component of the video signal to be recorded during every period of the horizontal scanning frequency, said means for producing a control voltage or voltages comprises DC restoring means for aligning the front end of the synchronizing signals in the video signal, fixed cutoff frequency low-pass filter means having a fixed cutoff frequency which is at least 10 times as high as the horizontal scanning frequency, and means for separating the control voltage or voltages from the video signal by passing the output video signal of said DC restoring means through said fixed cutoff frequency low-pass filter means.

4. A magnetic recording system as defined in claim 1 wherein said variable cutoff frequency low-pass filter means comprises at least one variable capacity diode, and means for changing the static capacity of said variable capacity diode responsive to changes in said control voltage or voltages.

5. A magnetic recording system as defined in claim 1 wherein said variable cutoff frequency low-pass filter means comprises at least one variable impedance diode, and means for connecting said diode to change its impedance responsive to changes in said control voltage or voltages, said diode or diodes thereby having an impedance which changes corresponding to the voltage applied thereto.